No. 851,308. PATENTED APR. 23, 1907.
C. NORDSTROM.
VALVE MECHANISM FOR ENGINES AND THE LIKE.
APPLICATION FILED FEB. 18, 1907.
2 SHEETS—SHEET 1.
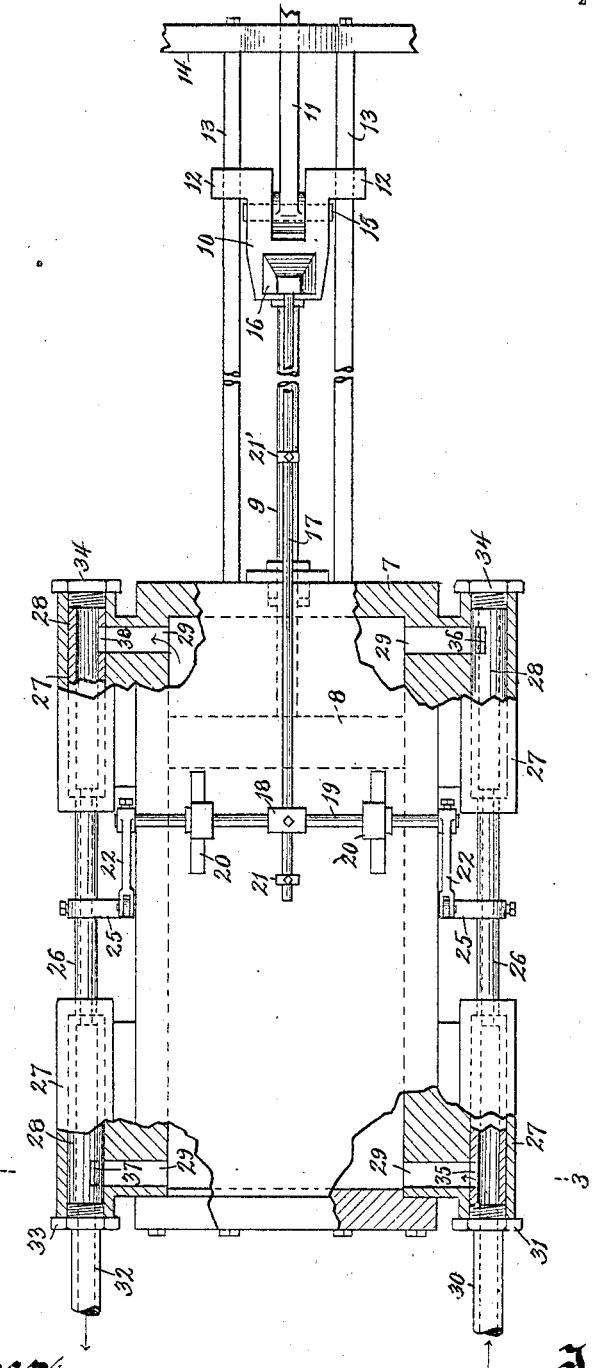

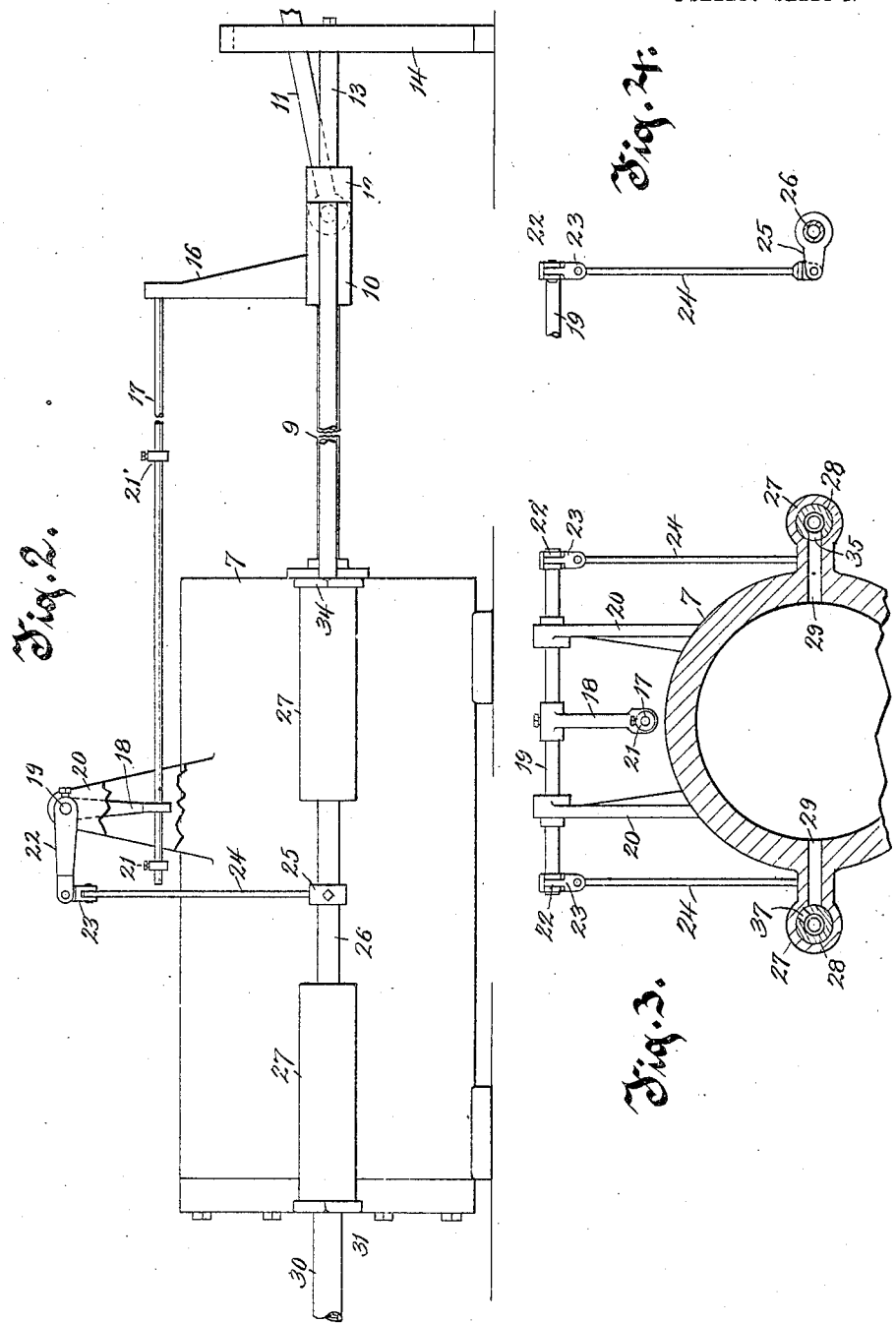

UNITED STATES PATENT OFFICE.

CHARLES NORDSTROM, OF MILWAUKEE, WISCONSIN, ASSIGNOR OF ONE-HALF TO PETER VALENTINE SEITZ, OF MILWAUKEE, WISCONSIN.

VALVE MECHANISM FOR ENGINES AND THE LIKE.

No. 851,308.　　　　　　Specification of Letters Patent.　　　　　Patented April 23, 1907.

Application filed February 18, 1907. Serial No. 357,843.

*To all whom it may concern:*

Be it known that I, CHARLES NORDSTROM, residing in Milwaukee, in the county of Milwaukee and State of Wisconsin, have invented new and useful Improvements in Valve Mechanism for Engines and the Like, of which the following is a description, reference being had to the accompanying drawings, which are a part of this specification.

This invention has for its object to provide a valve mechanism for engines and pumps, and particularly for water motors, in which the proper control of supply and exhaust to a working cylinder will be automatically accomplished by novel mechanism simple in construction and inexpensive to manufacture.

With the above and other objects in view the invention consists in the mechanism herein claimed, its parts and combinations of parts and all equivalents.

Referring to the accompanying drawings in which like characters of reference indicate the same parts in the several views; Figure 1 is a plan view of a water motor provided with a valve mechanism constructed in accordance with this invention, parts being broken away for clearness of illustration; Fig. 2 is a side elevation thereof; Fig. 3 is a transverse sectional view thereof on the plane of line 3—3 of Fig. 1; and, Fig. 4 is a detail view of the connection between the rock-shaft and the valve tubes.

In these drawings 7 represents a cylinder of ordinary construction in which a piston 8 operates, the piston rod 9 thereof being connected to a cross-head 10, which comprises a block connected to the piston rod at one end and having a slot in the other end in which a pitman 11 is connected, with lateral projections 12 extending from the members formed by the slot and having openings through which guide rods 13 pass. The guide rods 13 extend from the cylinder head to a distant support 14 and guide the cross-head in its movements and at the same time serve to prevent the removal of the loose pin 15 which connects the cross-head to the pitman.

An arm 16 is carried by the cross-head 10 and projects upwardly therefrom with a trip-rod 17 connected thereto and extending over the cylinder 7 with a sliding fit in the depending arm 18 of a rock-shaft 19, which is mounted on top of the cylinder in suitable bearing brackets 20. The trip-rod 17 is provided with a pair of adjustable stops 21 and 21' adapted to engage and move the arm 18 at the ends of the respective strokes of the piston. The rock-shaft 19 has crank arms 22 on its ends carrying connecting blocks 23 which are pivoted thereto and to links 24, the pivotal axis of one connection being at right angles to the pivotal axis of the other connection.

At their lower ends the links 24 connect with cranks 25 on valve tubes 26, one on each side of the cylinder, which are mounted to turn in cylindrical valve casings 27, preferably integral with the cylinder. Tubular valves 28 contained in said valve casings are mounted on the valve tubes 26 so as to be turned thereby when the cranks 25 are moved by the rock shaft 19 through the links 24, the connecting blocks 23 and the cranks 22. The tubular valves 28 are provided with ports which are adapted to register in one position or the other of the valves with passages 29 leading to the interior of the cylinder.

The valves on one side of the cylinder are for the supply and those on the other side are for the exhaust, and a supply pipe 30 is connected by a coupling 31 with a valve casing 27 of the former, and a corresponding exhaust pipe 32 is connected by means of a coupling 33 with a valve casing 27 of the latter. The valves 28 being open at their ends communicate with the supply and exhaust pipes and the pair of valves on each side of the cylinder connect with each other through their valve tubes 26, there being screw plugs 34 in the ends of valve casings 27 which do not have direct connection with the supply and exhaust pipes, to prevent leakage. The ports of the supply valves are designated 35 and 36 respectively and the ports of the exhaust valves are designated 37 and 38 respectively.

In operation, the parts being in the position shown in Fig. 1, with inlet port 35 and exhaust port 38 open and the other ports closed, water or other pressure fluid admitted by supply pipe 30 will pass through port 35 and force the piston 8 to move to the right, the fluid on the other side of the piston escaping through exhaust port 38 and by way of valve tube 26 and exhaust valve 28 to the exhaust pipe 32. During this movement of the piston the trip-rod 17 is carried thereby until the stop 21 strikes arm 18 and swings it, causing the rock-shaft to turn and by means of the cranks 22 and their connections turn the valve tubes 26 to close valve ports 35 and 38 and open valve ports 36 and 37. With this change in position of the valves the pressure fluid passes through the first supply valve 28 and through the valve tube 26 to the other supply valve, and through port 36 to the right hand end of the cylinder to move the piston to the left, the fluid in front of the piston being exhausted through valve port 37 and the exhaust pipe 32. This condition continues until the other stop, 21', strikes the arm 18 and moves the rock-shaft to restore the valves to their original position, when the direction of movement of the piston is changed and the cycle of operation is repeated as long as the pressure fluid is supplied.

With this invention the valve movements are accomplished automatically by mechanism which is simple in its construction and effective in its operation, being well adapted for inexpensive engines, such as the water motors for operating washing machines and the like.

What I claim as my invention is;

1. A valve mechanism for engines and the like, comprising pairs of valve casings communicating with the interior of the cylinder of the engine at opposite ends thereof, valves located in said valve casings, valve tubes connecting the valves of each pair of valve casings and constituting a communication therebetween, and means operated by the movements of the piston of the engine for moving the valve tubes to respectively open and close the valves thereof.

2. A valve mechanism for engines and the like, comprising pairs of valve casings having communication with opposite ends of the engine cylinder, tubular valves mounted in the valve casings, valve tubes connecting the valves of each pair of valve casings and constituting a communication therebetween, a supply pipe connected with one pair of valve casings, an exhaust pipe connected with another pair of valve casings, and means operated by the movements of the piston of the engine for turning the valve stems and opening and closing respectively the valves thereof.

3. A valve mechanism for engines and the like, comprising pairs of valve casings having communication with opposite ends of the engine cylinder, tubular valves in the valve casings, valve tubes connecting the valves of each pair of valve casings and constituting a communication therebetween, a rock-shaft journaled across the cylinder of the engine, crank and link connections between the rock-shaft and the valve tubes for causing the turning of the valve tubes by the movements of the rock-shaft, an arm on the rock-shaft, and means movable with the piston of the engine for engaging and moving the arm of the rock-shaft for changing the position of the valves.

4. A valve mechanism for engines and the like, comprising a cylinder, a piston operating therein, pairs of valve casings having communication with opposite ends of the cylinder, tubular valves located in the valve casings, valve tubes connecting the valves of each pair of valve casings and constituting a communication therebetween, a rock-shaft journaled across the cylinder, crank and link connections between the rock-shaft and the valve tubes, an arm carried by the rock-shaft, a piston rod carried by the piston, a cross-head mounted on the piston rod, guides for the cross-head, a trip-rod carried by the cross-head and passing through the arm, and stops on the trip-rod for engaging the arm and swinging the rock-shaft near the ends of the stroke of the piston to change the position of the valves.

5. A valve mechanism for engines and the like, comprising a cylinder, a piston operating therein, pairs of valve casings having communication with the interior of the cylinder at opposite ends thereof, tubular valves located in the valve casings, valve tubes connecting the valves of each pair of valve casings and constituting a communication therebetween, a supply pipe connecting with a valve casing of one pair, an exhaust pipe connecting with a valve casing of the other pair, screw plugs closing the ends of the other valve casings, cranks on the valve tubes, links connected to the cranks, connecting blocks on the links, a rock-shaft journaled across the cylinder, cranks thereon connected with the connecting blocks, an arm on the rock-shaft, a piston rod carried by the piston, a cross-head on the piston rod, guides for the cross-head, an arm on the cross-head, a trip-rod carried by said arm and passing through the arm of the rock-shaft, and adjustable stops on the trip-rod for engaging the arm of the rock-shaft near the ends of the stroke of the piston for swinging the rock-shaft and causing it to turn the valves from one position to another, whereby the direction of movement of the piston is changed.

In testimony whereof, I affix my signature, in presence of two witnesses.

CHARLES NORDSTROM.

Witnesses:
  R. S. C. CALDWELL,
  ANNA F. SCHMIDTBAUER.